United States Patent [19]

Lawson

[11] 4,451,057
[45] May 29, 1984

[54] FOOT-REST DEVICE FOR MOTORCYCLES

[76] Inventor: Louis L. Lawson, 5826 Riva Ridge Dr., Indianapolis, Ind. 46227

[21] Appl. No.: 342,067

[22] Filed: Jan. 25, 1982

[51] Int. Cl.³ .............................................. B62J 25/00
[52] U.S. Cl. ...................................... 280/291; 296/75
[58] Field of Search .................. 280/291, 289 R, 163, 280/164 R, 164 A, 165, 166, 169; 180/90.6; 296/75; 74/564; 297/427; 248/279, 287–289

[56] References Cited

U.S. PATENT DOCUMENTS 2,768,005 10/1956 Mennesson .......................... 280/291

FOREIGN PATENT DOCUMENTS

| 1012203 | 7/1957 | Fed. Rep. of Germany | 280/291 |
| 56076 | 11/1919 | Sweden | 280/281 R |
| 20672 | of 1913 | United Kingdom | 280/291 |
| 196761 | 5/1923 | United Kingdom | 280/291 |
| 200921 | 7/1923 | United Kingdom | 280/291 |
| 218847 | 7/1924 | United Kingdom | 280/291 |
| 756295 | 9/1956 | United Kingdom | 280/291 |
| 763669 | 12/1956 | United Kingdom | 280/291 |

Primary Examiner—Joseph F. Peters, Jr.
Assistant Examiner—Mitchell J. Hill
Attorney, Agent, or Firm—Robert A. Spray

[57] ABSTRACT

A foot-rest device for motorcycles, of a unitary but double rest type providing a foot-rest for each of the driver and the passenger, and connectable to the motorcycle by connection to the foot-rest pegs of the motorcycle usually without modification of the motorcycle or its foot-rest pegs; and the two foot-rests are rigidly interconnected, providing that the support of each of the foot-rests contributes to the support of the other.

5 Claims, 6 Drawing Figures

FOOT-REST DEVICE FOR MOTORCYCLES

The present invention relates to an auxiliary for a motorcycle or the like, and more particularly to a novel foot-rest device for the driver and passenger.

The concepts provide a double but unitary foot-rest, and interconnection means by which the two foot-rest body members are rigidly interconnected; and there are provided support means for supporting the assembly of the pair of foot-rest body members by the motorcycle device, the support of each foot-rest contributing to the support of the other.

The concepts further provide that both of the pair of foot-rests and their interconnection means are provided unitarily by a unitary plate-like member formed and shaped to permit the two foot-rests to be substantially parallel even though at different elevations when mounted on the motorcycle.

The concepts further provide that the device is supported by a supporting interconnection to the foot-rest pegs of the motorcycle, providing an ease and convenience of mounting and assembly, usually without any modification whatever of the motorcycle or its foot-rest pegs.

In a search made after this invention was made, the least remote of the prior art found in this field were two patents, as follows:

U.S. Pat. No. 4,174,852, issued to Panzica et al., Nov. 20, 1979. However, this patent, although showing a footrest mounted on a foot peg, gives no suggestion of many of the significant concepts of the present invention; e.g., it does not show a double rest, nor the support of one rest contributing to the support of the other rest. Further, it presents mounting and installation problems wholly avoided by the present invention.

U.S. Pat. No. 2,768,005, issued to M. L. Mennesson Oct. 23, 1956. This device likewise fails to show or suggest the present concepts, in that it provides no double foot-rest for driver and passenger, and does not provide a mounting upon the motorbike's foot-peg, and provides none of the concepts of this invention except that of a flat foot-rest; but since basic details of the present invention are not shown or suggested, this patent helps show the inventive non-obviousness of this invention's details and combinations, for this patent shows that the basic concept of a motorcycle foot-rest or floor board is itself quite old, yet the specific details of the present invention are indeed a departure.

The above is of introductory and generalized nature. More specific details, particulars, concepts, and features of the present invention are set forth in the following, more detailed, description of an illustrative embodiment, in which the inventive concepts are illustrated and explained in connection with an associated motorcycle, taken in conjunction with the accompanying somewhat schematic and diagrammatic drawings, in which:

FIG. 1 is a pictorial sketch of a motorcycle having mounted thereon a unitary but double foot-rest device according to the inventive concepts;

FIG. 2, in enlarged scale, is a pictorial view of the foot-rest device shown in FIG. 1, this one being the one for the cycle's left side.

Figure 3:
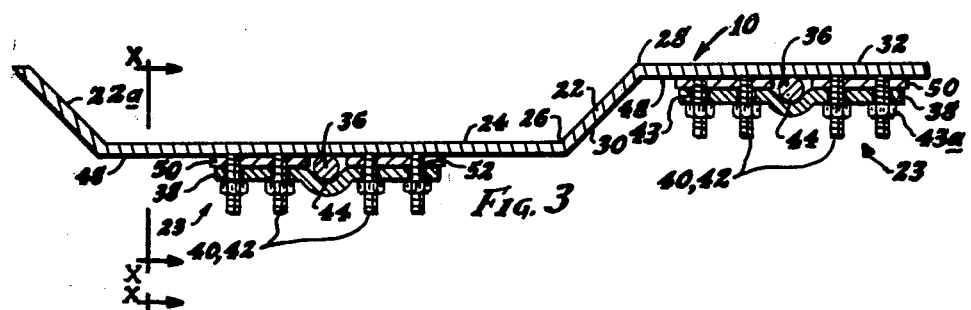
FIG. 3 is a longitudinal cross-sectional view through the foot-rest mounted on the foot-rest pegs of the associated motorcycle.
Figure 4:
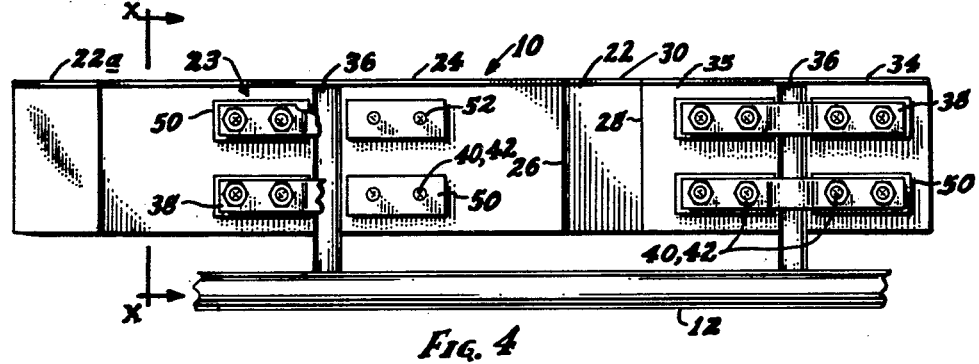
FIG. 4 is a bottom view of the foot-rest attached to the motorcycle as in FIG. 3, portions shown as broken away.
Figure 5:
Figure 6:
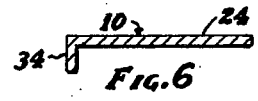

FIG. 5 is a cross-sectional view of the foot-rest body, this being a so-called dead-section, illustrative merely of the horizontal plate and the side lip or flange of the foot-rest body, but otherwise generally as shown by section-line X—X of FIGS. 3 and 4; and FIG. 6 is a cross-sectional view similar to FIG. 5, but of the horizontal plate and the side lip or flange of a foot-rest body which would be installed on the cycle's right side.

As shown in the drawings, the present inventive concepts provide a desirable and advantageous foot-rest device 10 for a motorcycle 12 which has seats 14–16 spaced fore-and-aft for the driver and his passenger, respectively, the two riders sitting one behind the other, and with the passenger's seat 16 somewhat elevated as well as rearwardly of the driver's seat 14.

The overall foot-rest device 10 is shown as providing a pair of foot-rest body members 18 and 20, forward foot-rest 18 being for the driver and the rearward foot-rest 20 being for the passenger; and interconnection means 22 are provided by which the two foot-rest body members 18 and 20 are interconnected. The front of the driver's rest 18 is upturned as at 22a.

As more fully described below, there are supports shown at 23 for supporting the assembly of the pair of foot-rest body members 18 and 20 and the interconnection means 22 from the motorcycle 12 itself.

In the form shown, the pair of foot-rest body members 18–20 and also the interconnection means 22 are provided unitarily by a unitary plate-like member 24 which has bends 26–28 in an intermediate portion thereof 30 and permitting the two foot-rest body members 18–20 to be substantially parallel, even though those foot-rest body members 18–20 are positioned at different elevations when the device 10 is mounted on the motorcycle device 12.

Figure 1:
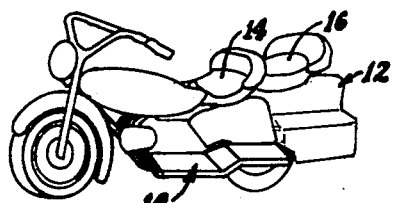
Figure 2:
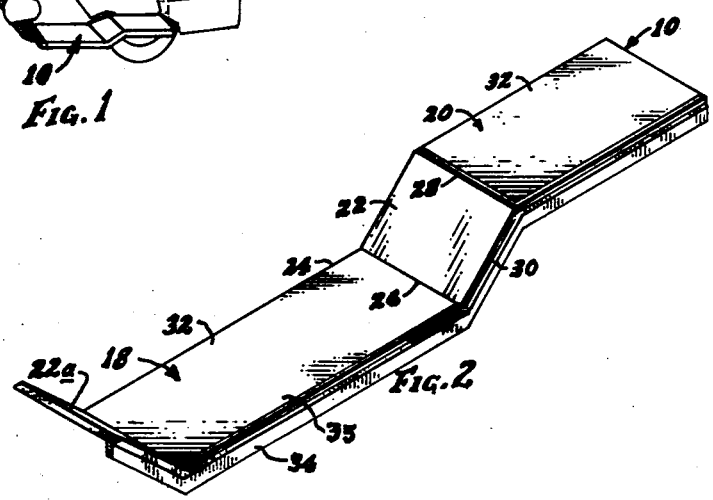

Advantageous from the standpoint of both non-interference as well as aesthetics, all the support for the device 10 lies wholly below the surface 32 of the respective ones of the foot-rest body members 18–20; and the support is substantially if not wholly concealed by the outer flange or lip 34 which extends downwardly from the outer edge 35 of the plate member 24, whether as a separate piece as shown in FIG. 2, or integrally as per FIGS. 5 and 6.

A very significant and advantageous characteristic of the device 10 and its support is that the support means 23 provides the support by a supporting interconnection to the foot-rest pegs 36 of the motorcycle 12. Those pegs 36 are customarily provided as original equipment on probably most motorcycles; and in most instances no altering whatever needs be done to those pegs 36 or to any other portion of the motorcycle.

More particularly as shown, the support means 23 includes retainer body members 38 each of which supportingly embraces one of the motorcycle device's foot-rest pegs 36; and there are provided fastening means 40 which are associated with each of the retainer body members 38 for securely fastening the respective retainer body member 38 to the respective foot-rest peg 36.

In the form shown, the fastening means 40 for each of the retainer body members 38 comprise members 42 which interengage the respective foot-rest body member 18–20 and the respective retainer body member 38 on both sides of the motorcycle device's respective foot-rest peg 36. The fasteners 40–42 are shown as clamp bolts welded to the underside of the rests 18–20 which pass through holes 43 in the retainer plates 38, with nuts 43a.

It will be seen that both of the retainer body members 38 are provided to have an upwardly-opening recess 44 in their respective upper faces; and, in the assembly of the respective retainer body member 38 to the respective foot-rest body member 18–20, the recess 44 seats under the respective foot-rest peg 36 with the other portions 46 of the retainer body members 38 adjacent the underside 48 of the foot-rest body member, a shim 50 being interposed between the respective retainer 38 and foot-rest member 18–20. The shims 50 have holes 52 for passage therethrough of the bolts 40–42.

A particular feature of the invention is that the interconnection means 22 rigidly interconnects the two foot-rests 18–20 into a rigid and unitary body member 10; and the support means 23 are of a type in which each of the two foot-rest body members are themselves individually connected to the motorcycle device, and thus the connection of each of the foot-rest body members 18–20 to the motorcycle not only provides support for the respective one of the foot-rests 18–20 to the motorcycle device, but also through the interconnecting means provides support for the other of the foot-rests 18–20.

It is thus seen that a unitary but double foot-rest device according to the inventive concepts provides a desired and advantageous device for a motorcycle or the like yielding the benefits of an economical yet attractive foot-rest device which is very sturdy and is easily and conveniently mounted onto the motorcycle, usually with no modification of the motorcycle or its foot-rest pegs. When assembled onto the motorcycle, it is quite sturdy, requires no maintenance except occasional cleaning, and is quite useful.

Accordingly, it will thus be seen from the foregoing description of the invention according to this illustrative embodiment, considered with the accompanying drawings, that the present invention provides new and useful concepts of a novel foot-rest device for a motorcycle yielding desired advantages and characteristics, and accomplishing the intended objects, including those hereinbefore pointed out and others which are inherent in the invention.

Modifications and variations may be effected without departing from the scope of the novel concepts of the invention; accordingly, the invention is not limited to the specific embodiment or form or arrangement of parts herein described or shown. Also, it will be understood that the double devices 10 will desirably be provided for each side of the motorcycle, as is indicated by FIGS. 5 and 6.

What is claimed is:

1. A foot-rest device for a motorcycle or the like device in which two riders may sit one behind the other, one rider being the driver and the other rider being the passenger, the motorcycle or like device being provided with forward and rearward support means, and having a forward seat for support of the driver, and having a rearward seat for support of a passenger, and the passenger seat being higher than that of the driver's seat, the foot-rest device comprising:

a pair of foot-rest body members, one being a forward one and the other being a rearward one, interconnection means by which the two foot-rest body members are rigidly interconnected but at different heights, the rearward one of the body members being higher than the forward one of the body members, corresponding to the relative heights of the driver's seat and of the passenger's seat; and support means for supporting the rigid assembly of the pair of foot-rest body members and the interconnection means from the motorcycle device's support means, with the support of the forward one of the foot-rest body members by the motorcycle device's forward support means thus contributing to the support of the rearward one of the foot-rest body members, and the support of the rearward one of the foot-rest body members by the motorcycle device's rearward support means also contributing to the support of the forward one of the foot-rest body members.

2. The invention as set forth in claim 1, in a combination in which both of the said pair of foot-rest body members and the said interconnection means are provided unitarily by a unitary plate-like member which has bends in an intermediate portion thereof and permits the two foot-rest body members to be substantially parallel even though at different elevations when mounted on the motorcycle device.

3. The invention as set forth in claim 1, in a combination in which the support means provides its said support by a supporting interconnection to the foot-rest pegs of the motorcycle device.

4. The invention as set forth in claim 1 in a combination in which the interconnection means rigidly interconnects the two foot-rest body members into a rigid and unitary body member, and the support means includes the provision that each of the two foot-rest body members are individually connected to the motorcycle device, the connection of each of the foot-rest body members to the motorcycle not only supporting the respective foot-rest body member to the motorcycle device, but also through the interconnecting means providing support for the other of the foot-rest body members.

5. The invention as set forth in claim 1, in a combination which the foot-rest body members are provided along their outer edges with a downwardly-extending lip or flange which provides both a stiffening of the body members and also an operative concealment of the suppport means.

* * * * *